G. P. ROBERTS.
GIN SAW CLEANER.
APPLICATION FILED MAR. 20, 1909.
961,162.
Patented June 14, 1910.
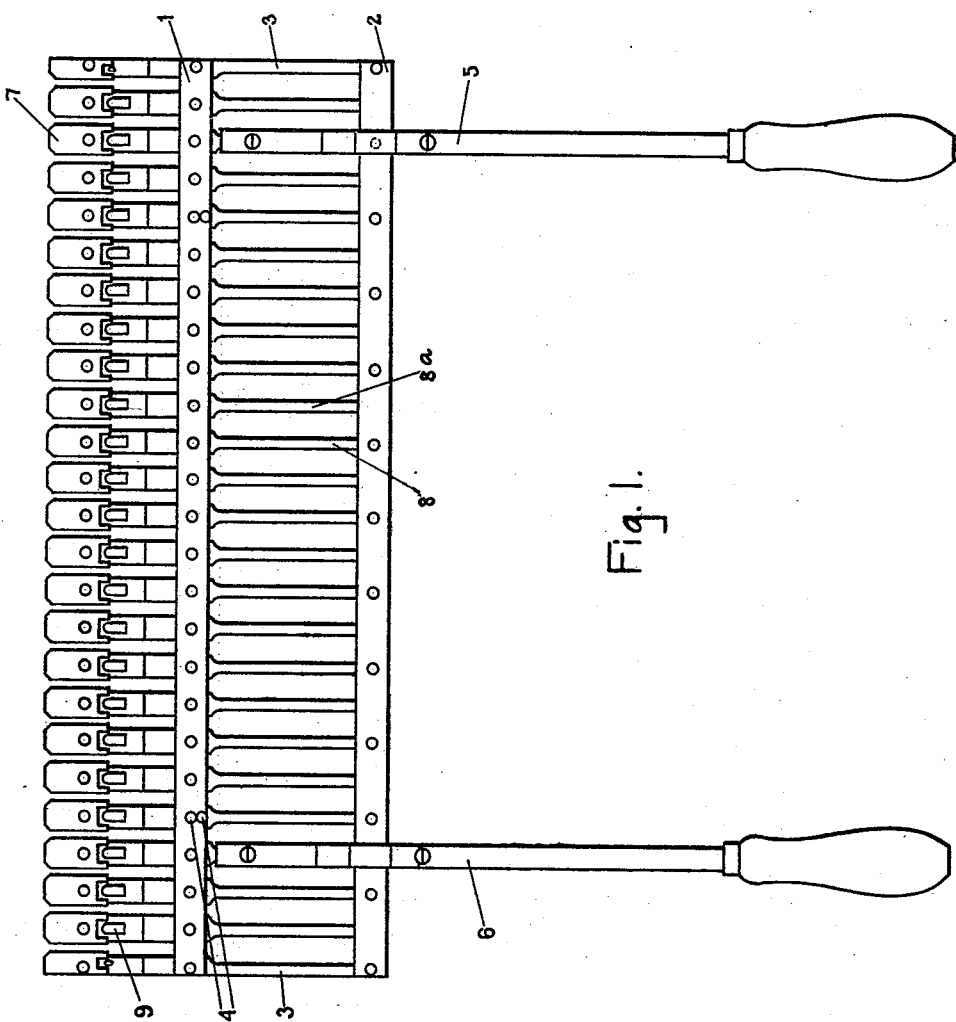
WITNESSES:
INVENTOR.
George P. Roberts
BY
ATTORNEY.

UNITED STATES PATENT OFFICE.

GEORGE P. ROBERTS, OF DALLAS, TEXAS.

GIN-SAW CLEANER.

961,162.

Specification of Letters Patent. Patented June 14, 1910.

Application filed March 20, 1909. Serial No. 484,673.

*To all whom it may concern:*

Be it known that I, GEORGE P. ROBERTS, a citizen of the United States, residing at Dallas, in the county of Dallas and State of Texas, have invented certain new and useful Improvements in Gin-Saw Cleaners, of which the following is a specification.

My invention relates to new and useful improvements in gin-saw cleaners. Its object is to provide a manually operated device, by means of which a plurality of the saws upon a mandrel may be quickly and efficiently freed from the gum, leaves and other objectionable matter, which accumulate upon the saws in the process of ginning cotton.

A further object is to provide a gin-saw cleaner, having a plurality of pivoted fingers, mounted on two frames pivoted one upon the other, and adapted by suitable handles to be brought to bear forcibly upon the sides of the gin-saws, so as to scrape the gum and dirt therefrom.

Finally the object of the invention is to provide a device of the character described that will be strong, durable, simple and efficient, and comparatively easy to produce, and also one which will not be likely to get out of working order.

With these and various other objects in view, my invention has relation to certain novel features of construction and operation, an example of which is described in the following specification, and illustrated in the accompanying drawing, wherein:

Figure 1 is a front view of the gin-saw cleaner, and Fig. 2 is an end view thereof.

Referring now more particularly to the drawings wherein like numerals of reference designate similar parts in all the figures, the numeral 1 denotes a pair of adjacent bars extending longitudinally of the device, between which are riveted the fingers 3, 8, and 8ª.

The bars 1 extend across the middle parts of the fingers, and the inner extremity of each of the fingers is riveted to one of a pair of parallel bars 2 similar to bars 1.

The numerals 8 and 8ª denote alternate fingers the fingers 8 being riveted to one of the bars 2, and the fingers 8ª being riveted to the other bar 2.

The numeral 3 designates the two outer fingers.

The alternate fingers 8 and 8ª thus form with their corresponding bars 2 two separate frames, the bars 1 appertaining to both frames, and one frame being pivoted upon the other. Double rivets 4 are employed to fasten several of the fingers 8 between the bars 1, so as to make the frame containing these fingers rigid. The frame containing the fingers 8ª is pivoted so that these fingers may be swung at an angle with the parallel bars 1 and 2.

A handle 5 is attached to one of the fingers 8 of the rigid frame by cap screws 13 and a handle 6 is attached to one of the fingers 8ª of the pivoted frames by similar means. By manipulating the handle 6 to either side, the fingers 8ª are swung at a slight angle so as to cause their forward extremities to approach the fingers 8. Upon the forward extremities of both sets of fingers, cleaner plates 7 are pivotally riveted. The inner extremities of these plates are bifurcated, and raised tongues 9 on the fingers project into the bifurcations, and limit the extent to which the plates 7 may turn upon their pivotal rivets 10. The numeral 10 is used to denote also the rivets fastening the fingers between the two pairs of cross-bars 1. The forward extremities of the fingers are bent slightly at a point 11, so that said extremities may be easily adjusted to the saws of a mandrel without obliging the operator to stoop. The handles 5 and 6 are arched at points 12 to carry them over the upper bar 2.

In the operation of the gin-saw cleaner the saw mandrel is set into rotation, and the upturned extremities of the fingers are inserted one between each of the saws upon the mandrel, the size and spacing of the fingers being adapted to allow the fingers a slight amount of lateral motion when thus positioned. The handles are now manipulated so as to cause the forward extremities of the alternate fingers 8 and 8ª to approach each other. The plates 7 will swing to adjust themselves to the saws, and by exerting pressure upon the handles 5 and 6, the plates 7 may be made to grip the sides of the saws firmly and to quickly remove all gum and dirt therefrom, as the saws rotate.

It is understood that the number of fingers used and the other similar details of construction may be varied without departing from the spirit of the invention as covered by the following claims.

What I claim is:

1. In a gin saw cleaner, the combination with a rigid frame, consisting of a plurality of parallel fingers, having braces transversely secured thereupon, of a swivel frame, consisting of a plurality of parallel fingers, pivoted at their middle portion to one of said transverse braces, and positioned between the fingers of the rigid frame, another transverse brace being pivotally attached to the inner extremities of the pivoted fingers of the swivel frame, and handles attached to each of said frames, substantially as described.

2. In a gin saw cleaner, the combination with a rigid frame, composed of a plurality of parallel fingers and braces transversely secured thereupon, of a swivel frame composed of a plurality of parallel fingers alternating with the fingers of the rigid frame, and pivoted on said frame, and connected by a transverse bar having pivotal attachment to each finger, means attached to the finger extremities adapted to engage the sides of saws, and operating handles rigidly secured to each of said frames, substantially as described.

3. In a gin saw cleaner, the combination with a rigid frame, consisting of a series of parallel fingers, and transverse bars rigidly secured thereupon, of a swivel frame, consisting of a series of parallel fingers, positioned between the fingers of the rigid frame, and pivoted upon said rigid frame, the pivoted fingers being connected at one extremity by a transverse bar having pivotal attachment to each finger, a plate pivoted to the forward extremity of each finger of both frames, and an operating handle secured to each frame.

4. In a gin saw cleaner, the combination with a rigid frame, composed of a plurality of parallel fingers, having a transverse bar attached to each side thereof near their centers, and a transverse bar attached to their rear extremities, the forward extremities of the fingers being deflected at a uniform angle, of a swivel frame, composed of a plurality of parallel fingers, alternating with the fingers of the rigid frame and similarly deflected at their forward extremities, and pivoted between the oppositely disposed transverse bars of the rigid frame, the rear extremities of the fingers being pivotally connected by a bar, pivotally mounted plates upon the forward extremities of both sets of fingers and an operating handle rigidly secured to each frame.

5. In a gin saw cleaner, the combination with a plurality of parallel fingers, upwardly deflected at their forward extremities, of cross bars forming a rigid frame with said fingers, a plurality of parallel fingers, alternately disposed between the first fingers, pivoted to one of said cross bars, and upwardly deflected at their forward extremities, a cross bar having pivotal attachment with each of the last named fingers, forming a pivotal frame therewith, a swivel plate mounted upon the forward extremity of each finger, means whereby the angular motion of the swivel plates is limited, and a handle attached to each of said frames.

6. In a gin saw cleaner, the combination with a plurality of fingers, upwardly deflected at their forward extremities means rigidly connecting said fingers forming therewith a rigid frame, a plurality of fingers pivotally mounted in alternation with the first named fingers, and having similarly deflected forward extremities, means pivotally connecting the last named fingers, forming therewith a swivel frame, pivotally mounted plates upon the forward extremities of the fingers, having slotted rear ends, upwardly deflected tongues, in the forward extremities of the fingers entering said slotted ends, and an operating handle, attached to each of said frames, extending rearwardly therefrom.

In testimony whereof I have signed my name to this specification in the presence of two subscribing witnesses.

GEORGE P. ROBERTS.

Witnesses:
G. B. COULSON,
J. N. KIRK.